United States Patent
Yamanaka et al.

(10) Patent No.: US 7,898,767 B2
(45) Date of Patent: Mar. 1, 2011

(54) PERPENDICULAR MAGNETIC RECORDING HEAD INCLUDING HEATING ELEMENT

(75) Inventors: Kunio Yamanaka, Niigata-ken (JP); Jun Takahashi, Niigata-ken (JP); Akira Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 857 days.

(21) Appl. No.: 11/880,718

(22) Filed: Jul. 24, 2007

(65) Prior Publication Data

US 2008/0030905 A1    Feb. 7, 2008

(30) Foreign Application Priority Data

Aug. 1, 2006   (JP)  ............... 2006-209732

(51) Int. Cl.
*G11B 5/147* (2006.01)
*G11B 5/33* (2006.01)

(52) U.S. Cl. .............................. 360/125.31; 360/125.74

(58) Field of Classification Search .............. 360/125.3, 360/125.31, 125.32, 125.75
See application file for complete search history.

(56) References Cited

U.S. PATENT DOCUMENTS

| 5,991,113 | A * | 11/1999 | Meyer et al. .................. 360/75 |
| 6,760,191 | B1 * | 7/2004 | Yan et al. ..................... 360/128 |
| 6,950,280 | B2 * | 9/2005 | Rea et al. ................ 360/125.31 |
| 6,963,470 | B2 * | 11/2005 | Sato ....................... 360/125.42 |
| 7,035,046 | B1 * | 4/2006 | Young et al. ........... 360/125.75 |
| 7,092,193 | B1 * | 8/2006 | McKenzie et al. ............ 360/75 |
| 7,170,713 | B2 * | 1/2007 | Gider et al. .................. 360/128 |
| 7,403,354 | B2 * | 7/2008 | Pust et al. ............... 360/125.31 |
| 7,612,965 | B2 * | 11/2009 | Kurihara et al. ........ 360/125.75 |
| 7,649,713 | B2 * | 1/2010 | Ota et al. ................ 360/125.32 |
| 7,656,619 | B1 * | 2/2010 | Yan et al. .................. 360/294.7 |
| 7,729,087 | B1 * | 6/2010 | Stoev et al. ............ 360/125.74 |
| 7,729,092 | B1 * | 6/2010 | Mallary et al. ............... 360/317 |
| 2003/0174430 | A1 * | 9/2003 | Takahashi et al. ............. 360/75 |
| 2006/0291098 | A1 * | 12/2006 | Ota et al. ..................... 360/128 |

FOREIGN PATENT DOCUMENTS

| JP | 2004095146 | 3/2004 |
| JP | 2004199797 | 7/2004 |

OTHER PUBLICATIONS

Office Action issued in corresponding Japanese Patent Application No. 2006-209732; mailed Jul. 8, 2008, Not in English.

* cited by examiner

*Primary Examiner*—Brian E Miller
(74) *Attorney, Agent, or Firm*—Brinks Hofer Gilson & Lione

(57) ABSTRACT

A perpendicular magnetic recording head includes a read part disposed on a substrate to read magnetic recording information from a recording medium by a magnetoresistance effect; a write part disposed above the read part to record magnetic information on the recording medium by applying a perpendicular magnetic field, and including a write coil; a heating element disposed between the write coil and the read part; and a heat-dissipating layer disposed between the write coil and the heating element. The heating element generates heat when supplied with current so that the read part is thermally expanded to protrude toward the recording medium. The heat-dissipating layer has a heat dissipation effect.

4 Claims, 5 Drawing Sheets

PERPENDICULAR MAGNETIC RECORDING HEAD INCLUDING HEATING ELEMENT

CLAIM OF PRIORITY

This application claims benefit of the Japanese Patent Application No. 2006-209732 filed on Aug. 1, 2006, which is hereby incorporated by reference.

BACKGROUND OF THE INVENTION

1. Field of the Invention

The present invention relates to perpendicular magnetic recording heads that allow control of the amount of float with a read part that can be thermally expanded to protrude locally toward a recording medium.

2. Description of the Related Art

Perpendicular recording, in which a recording medium is magnetized in a direction perpendicular to a surface thereof, has been expected to support achievement of higher recording densities in future because this system enables recording of magnetic information at higher densities than longitudinal recording, in which a recording medium is magnetized in a direction parallel to a surface thereof. A thin-film magnetic head utilizing perpendicular recording (perpendicular magnetic recording head) includes a read part for reading magnetic recording information from a recording medium by a magnetoresistance effect and a write part, disposed above the read part, for recording magnetic information on the recording medium by applying a recording magnetic field perpendicular thereto (perpendicular magnetic field). The read part includes, for example, opposing lower and upper shield layers separated by a predetermined distance in a surface of the head facing the recording medium and a multilayer film disposed between the lower and upper shield layers to provide a magnetoresistance effect. The write part includes, for example, a main pole layer, a return yoke layer disposed opposite the main pole layer with a magnetic gap layer disposed therebetween in the surface facing the recording medium, and a write coil disposed between the main pole layer and the return yoke layer to apply a recording magnetic field to the main pole layer.

A minimal distance between the perpendicular magnetic recording head and the recording medium (amount of float) is preferred to enhance head characteristics (particularly, read characteristics). A variety of magnetic recording heads have been proposed which include a heating element capable of generating heat when supplied with current near a read part so that the read part can be thermally expanded to protrude toward the recording medium by about several nanometers. The heating element is formed between any layers constituting the element parts in a flat pattern parallel to the surfaces of the layers. For example, the heating element can be disposed in the same layer as the read part behind the read part in a height direction, above a return yoke layer, or between the read part and the write part.

Known perpendicular magnetic recording heads are disclosed in, for example, Japanese Unexamined Patent Application Publication Nos. 2003-297029 and 2006-134461 and U.S. Patent Application Publication Nos. US20040130820 A1 and US20050083608 A1.

If, however, a heating element is disposed between a write part and a read part, heat is transferred from the heating element to a write coil to promote a rise in coil temperature. FIG. 5 is a graph showing measurements of the temperature rise (° C.) of write coils of perpendicular and longitudinal thin-film magnetic recording heads with varying powers (mW) supplied to heating elements. FIG. 5 shows that the write coil of the perpendicular magnetic recording head experiences a larger temperature rise than that of the longitudinal magnetic recording head and that the difference in temperature rise is increased as the power supplied to the heating elements is increased. As the coil temperature rises, heat is concentrated into a main pole layer disposed above the write coil. As a result, the main pole layer is thermally expanded to protrude toward a recording medium. If the amount of protrusion of the main pole layer is larger than that of the read part, the main pole layer comes into contact with the recording medium before the read part does. This can result in degraded read/write characteristics and damage to the recording medium.

SUMMARY OF THE INVENTION

The present invention provides a perpendicular magnetic recording head capable of reducing a rise in coil temperature due to heat generated from a heating element to suppress thermal expansion of a main pole layer.

The present invention is based on the fact that a heat-dissipating layer disposed between a write coil and a heating element to absorb heat therefrom and releasing it to the outside can reduce a rise in coil temperature due to heat from the heating element to suppress thermal expansion of a main pole layer.

That is, a perpendicular magnetic recording head according to the present invention includes a read part disposed on a substrate to read magnetic recording information from a recording medium by a magnetoresistance effect; a write part disposed above the read part to record magnetic information on the recording medium by applying a perpendicular magnetic field, and including a write coil; a heating element disposed between the write coil and the read part; and a heat-dissipating layer disposed between the write coil and the heating element. The heating element generates heat when supplied with current so that the read part is thermally expanded to protrude toward the recording medium. The heat-dissipating layer has a heat dissipation effect.

Preferably, the perpendicular magnetic recording head further includes a conductive layer behind the read part and the write part in a height direction, and the heat-dissipating layer is connected to the substrate via the conductive layer to transfer heat from the write coil to the substrate. This structure facilitates the dissipation of heat from the heating element and the write coil because the heat is released to the outside via the heat-dissipating layer, the conductive layer, and the substrate.

The heat-dissipating layer is preferably wider than the heating element both in a track-width direction and in the height direction. This facilitates heat dissipation. Specifically, the heat-dissipating layer preferably has a front end positioned closer to a surface of the head facing the recording medium than the heating element without being exposed in the surface facing the recording medium and a rear end positioned behind an upper shield layer of the read part and a return yoke layer of the write part in the height direction.

It is practical that the heat-dissipating layer be formed of a metal material containing at least one metal selected from gold, copper, aluminum, platinum, silver, tungsten, nickel, rhodium, iron, cobalt, chromium, tantalum, and titanium because such a material has excellent thermal conductivity.

According to the present invention, the heat-dissipating layer disposed between the write coil and the heating element releases heat from the heating element to the outside, and accordingly less heat is transferred to the write coil. The heat-dissipating layer also releases heat from the write coil to the outside. The heat-dissipating layer can thus reduce a rise in coil temperature due to heat from the heating element to suppress thermal expansion of a main pole layer. Therefore, the perpendicular magnetic recording head can provide excellent head characteristics.

DESCRIPTION OF THE PREFERRED EMBODIMENTS

The present invention will now be described with reference to the drawings, where the X direction indicates a track-width direction, the Y direction indicates a height direction, and the Z direction indicates the stacking direction of layers Constituting a perpendicular magnetic recording head and the movement direction of a recording medium.

Figure 1:
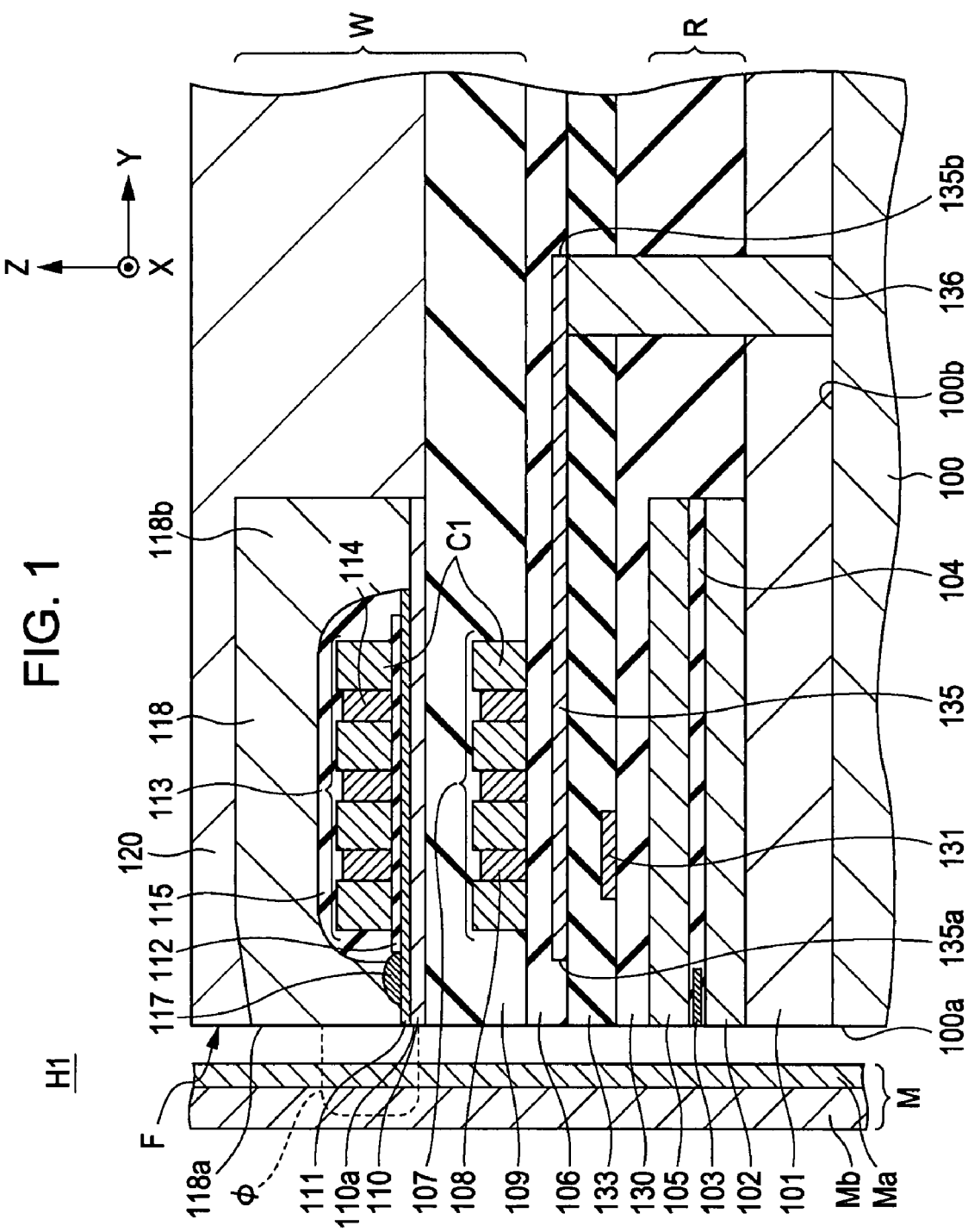
FIG. 1 is a longitudinal sectional view of a perpendicular magnetic recording head according to a first embodiment of the present invention.
Figure 2:
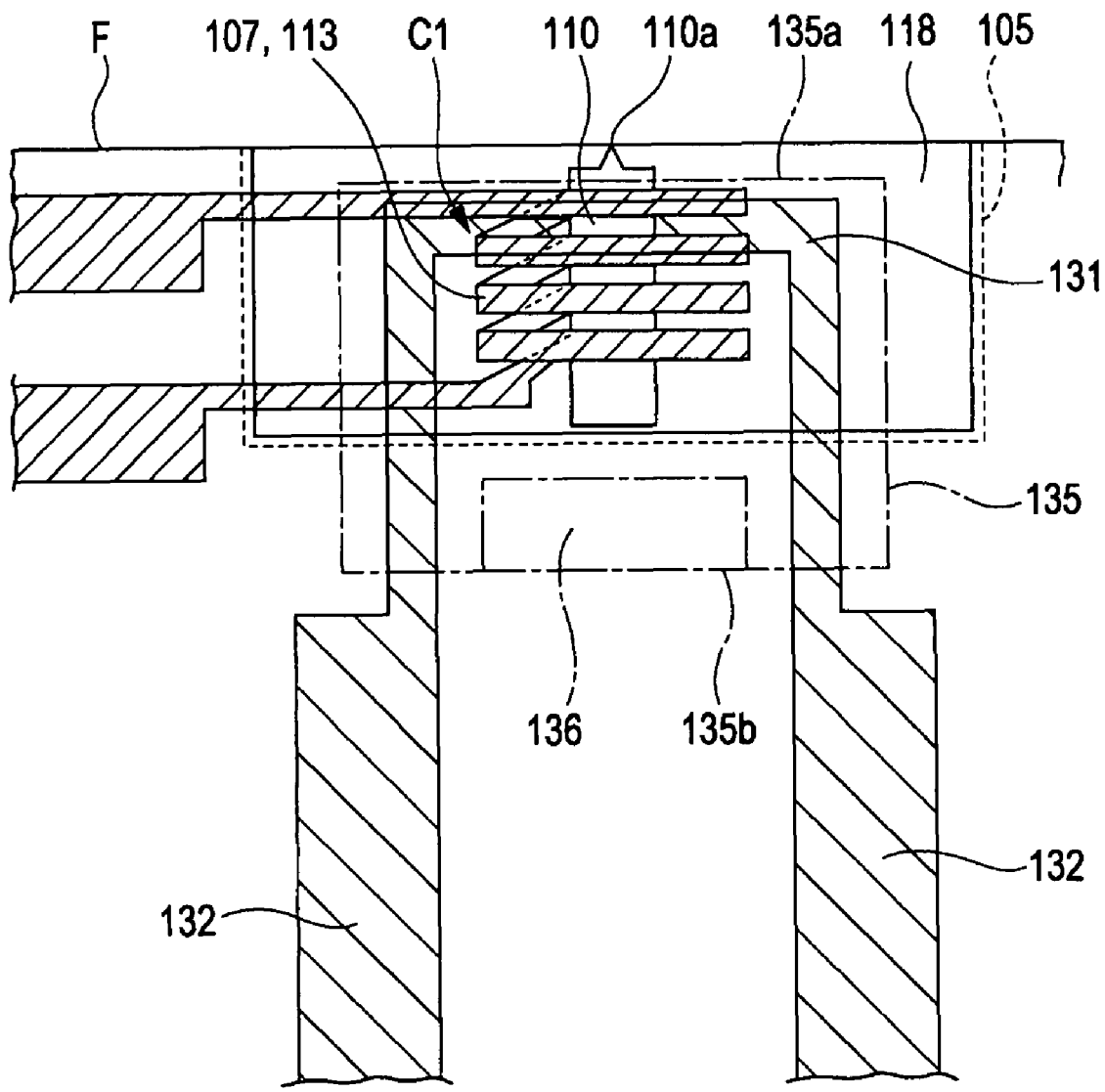
FIG. 2 is a plan view of the perpendicular magnetic recording head shown in FIG. 1, showing the positional relationship between a heating element, a heat-dissipating layer, a conductive layer, and a write coil (lower coil portions)

FIGS. 1 and 2 depict a perpendicular magnetic recording head including a solenoidal write coil according to a first embodiment of the present invention. FIG. 1 is a longitudinal sectional view of the perpendicular magnetic recording head which is taken along the center of a read part and a write part. FIG. 2 is a plan view of the perpendicular magnetic recording head as viewed from above the write coil.

A perpendicular magnetic recording head H1 includes a read part R and a write part W on a trailing end surface 100$b$ of a slider 100. The read part R and the write part W are composed of thin films stacked on top of each other. The read part R reads magnetic information from a recording medium M by a magnetoresistance effect. The write part W performs write operation by applying a perpendicular magnetic field Φ to the recording medium M to magnetize a hard film Ma of the recording medium M perpendicularly.

The recording medium M includes the hard film Ma, which is an outer layer with high remanent magnetization, and an inner soft film Mb with high magnetic permeability. For example, this recording medium M is disk-shaped and rotatable about the center thereof. The slider 100 is formed of a nonmagnetic material such as $Al_2O_3$ or TiC and has a surface 100$a$ facing the recording medium M. As the recording medium M is rotated, an air flow allows the slider 100 to float over a surface of the recording medium M.

A protective layer 101 is disposed on the trailing end surface 100$b$ of the slider 100. The protective layer 101 is formed of a nonmagnetic insulating material such as $Al_2O_3$ or $SiO_2$. The read part R is disposed on the protective layer 101. The read part R includes a lower shield layer 102, an upper shield layer 105, a gap insulating layer 104 disposed therebetween, and a read element 103 disposed inside the gap insulating layer 104. The read element 103 is a magnetoresistive element such as an anisotropic magnetoresistive (AMR) element, a giant magnetoresistive (GMR) element, or a tunneling magnetoresistive (TMR) element.

The write part W includes lower coil portions 107, a main pole layer (magnetic core layer) 110, a magnetic gap layer 111, upper coil portions 113 disposed above the magnetic gap layer 111 with a coil insulating layer 112 disposed therebetween, and a return yoke layer (magnetic core layer) 118.

The lower coil portions 107 are formed of, for example, at least one nonmagnetic metal material selected from gold, silver, platinum, copper, chromium, aluminum, titanium, NiP, molybdenum, palladium, rhodium, and nickel. The lower coil portions 107 can also have a multilayer structure of such nonmagnetic metal materials. The gaps between the lower coil portions 107 are filled with an organic insulating layer 108.

A lower coil insulating layer 109 is formed around the lower coil portions 107. A seed layer is formed on the lower coil insulating layer 109. The main pole layer 110 is formed on the seed layer. The lower coil insulating layer 109 is formed of at least one inorganic insulating material selected from AlO, $Al_2O_3$, $SiO_2$, $Ta_2O_5$, TiO, AlN, AlSiN, TiN, SiN, $Si_3Ni_4$, NiO, WO, $WO_3$, BN, CrN, and SiON.

The main pole layer 110 has a predetermined length from a surface F of the perpendicular magnetic recording head H1 facing the recording medium M in the Y direction. The width of a front surface 110$a$ of the main pole layer 110 exposed in the surface F in the X direction is defined as a recording track width. The main pole layer 110 is formed of a ferromagnetic material with high saturation flux density, such as a nickel-iron alloy, a cobalt-iron alloy, or a nickel-iron-cobalt alloy.

A throat-height-defining layer 117 is disposed on the magnetic gap layer 111 on the main pole layer 110 at a position away from the surface F by a predetermined distance. The throat-height-defining layer 117 is formed of an inorganic or organic material. The throat height of the perpendicular magnetic recording head H1 is defined by the distance between the surface F and the front end of the throat-height-defining layer 117.

The upper coil portions 113 are similar to the lower coil portions 107. That is, the upper coil portions 113 are formed of, for example, at least one nonmagnetic metal material selected from gold, silver, platinum, copper, chromium, aluminum, titanium, NiP, molybdenum, palladium, rhodium, and nickel. The upper coil portions 113 can also have a multilayer structure of such nonmagnetic metal materials. The gaps between the upper coil portions 113 are filled with an organic insulating layer 114. An upper coil insulating layer 115 is formed around the upper coil portions 113. The upper coil insulating layer 115 is formed of at least one inorganic insulating material selected from AlO, $Al_2O_3$, $SiO_2$, $Ta_2O_5$, TiO, AlN, AlSiN, TiN, SiN, $Si_3Ni_4$, NiO, WO, $WO_3$, BN, CrN, and SiON.

Ends of the lower coil portions 107 and the upper coil portions 113 in the X direction are electrically connected to each other to constitute a solenoidal write coil C1.

The return yoke layer 118 is disposed over the upper coil insulating layer 115 and the magnetic gap layer 111. The return yoke layer 118 is formed of a ferromagnetic material such as permalloy. The return yoke layer 118 has a front surface 118$a$ exposed in the surface F. The main pole layer 110 and the return yoke layer 118 are disposed opposite each other with a gap distance defined therebetween in the surface F. The return yoke layer 118 also has a connection portion 118b connected to the main pole layer 110 at its rear end in the height direction. The return yoke layer 118 is covered with a surface protective layer 120.

The read part R (upper shield layer 105) and the write part W (lower coil portions 107) are separated by, in sequence from the read part R side, an insulating layer 130, a heating element 131 capable of generating heat when supplied with current, another insulating layer 133, a heat-dissipating layer 135 having a heat dissipation effect, and a coil insulating layer 106 disposed under the lower coil portions 107. The heating element 131 is surrounded by the insulating layers 130 and 133. The heat-dissipating layer 135 is surrounded by the insulating layer 133 and the coil insulating layer 106. The insulating layers 130 and 133 and the coil insulating layer 106 are formed of at least one inorganic insulating material selected from AlO, $Al_2O_3$, $SiO_2$, $Ta_2O_5$, TiO, AlN, AlSiN, TiN, SiN, $Si_3Ni_4$, NiO, WO, $WO_3$, BN, CrN, and SiON.

Referring to FIG. 2, the heating element 131 is not exposed in the surface F, but is formed in a heating element pattern extending from the two sides of the read part R in the track-width direction to the rear thereof in the height direction. The heating element 131 is formed by, for example, sputtering of a nickel-iron alloy, a copper-nickel alloy, or a copper-manganese alloy. The rear of the heating element 131 in the height direction is connected to a pair of electrode leads 132 wider than the heating element 131. The heating element 131 is supplied with current via the electrode leads 132. The electrode leads 132 are formed of the same material as the heating element 131 or a conductive material with higher thermal conductivity than the heating element 131. The electrode leads 132 themselves generate heat when supplying current to the heating element 131, thus functioning as part of the heating element 131.

In FIG. 2, the heat-dissipating layer 135 has a rectangular shape in plan view. The heat-dissipating layer 135 has a front end 135a positioned closer to the surface F than the heating element 131 without being exposed in the surface F and a rear end 135b positioned behind the upper shield layer 105 and the return yoke layer 118 in the height direction. The distance between the front end 135a and the rear end 135b, that is, the length of the heat-dissipating layer 135 in the height direction, is larger than those of the heating element 131 and the lower coil portions 107 (upper coil portions 113). The width of the heat-dissipating layer 135 in the track-width direction is larger than those of the heating element 131 and the lower coil portions 107 (upper coil portions 113). In other words, the heat-dissipating layer 135 is wider than the heating element 131 and the lower coil portions 107 (upper coil portions 113) both in the height direction and in the track-width direction. The heat-dissipating layer 135 can thus diffuse (dissipate) heat from the heating element 131 and the lower coil portions 107 (upper coil portions 113) over a wide area. The heat-dissipating layer 135 is formed by, for example, sputtering of a metal material with excellent thermal conductivity which contains at least one metal selected from copper, gold, aluminum, platinum, silver, tungsten, nickel, rhodium, iron, cobalt, chromium, tantalum, and titanium. The heat-dissipating layer 135 has a thickness on the order of hundreds of nanometers.

The rear end 135b of the heat-dissipating layer 135 is connected to a conductive layer 136 formed of a material with high thermal conductivity, such as copper, gold, aluminum, platinum, or permalloy. The heat-dissipating layer 135 is connected to the slider 100 via the conductive layer 136. The conductive layer 136 can enhance the heat dissipation effect of the heat-dissipating layer 135 by transferring heat absorbed by the heat-dissipating layer 135 to the slider 100.

The slider 100 has a much larger surface area than the heat-dissipating layer 135 and can release the heat to the outside. The conductive layer 136 can be formed by, for example, sputtering. The conductive layer 136 can be formed simultaneously when the lower shield layer 102 and the upper shield layer 105 are formed.

In read operation of the perpendicular magnetic recording head H1, the heating element 131 is supplied with current to radiate heat. Most of heat radiated upward from the heating element 131 does not reach the layers upper than the heat-dissipating layer 135, including the lower coil portions 107 and the main pole layer 110, because the heat is absorbed by the heat-dissipating layer 135 and is released to the outside via the conductive layer 136 and the slider 100. The heat-dissipating layer 135 can therefore reduce a rise in coil temperature due to the heat from the heating element 131 to suppress thermal expansion of the main pole layer 110. This prevents the main pole layer 110 from excessively protruding toward the recording medium M and thus prevents the write part W, including the main pole layer 110, from damaging the recording medium M by butting thereagainst. On the other hand, heat radiated from the heating element 131 downward and toward the surface F reaches the periphery of the read element 103. Accordingly, the periphery of the read element 103 is heated from the two sides thereof in the track-width direction and from the rear thereof in the height direction. The periphery of the read element 103 is then thermally expanded, so that the read element 103 protrudes locally toward the recording medium M and operates in this state. The local protrusion thus reduces the distance between the read element 103 and the recording medium M to increase read output.

In write operation of the perpendicular magnetic recording head H1, the lower coil portions 107 and the upper coil portions 113 are supplied with current to induce a perpendicular magnetic field Φ which is applied to the recording medium M. Although the lower coil portions 107 and the upper coil portions 113 generate heat when supplied with current, the heat is transferred to the heat-dissipating layer 135, which is positioned under the lower coil portions 107. The heat-dissipating layer 135 releases the heat to the outside via the conductive layer 136 and the slider 100, thus preventing the write part W from protruding toward the recording medium M as a result of thermal expansion. The heating element 131 is not supplied with current during the write operation.

The perpendicular magnetic recording head H1 is produced as follows.

First, the protective layer 101, the lower shield layer 102, the read element 103, the gap insulating layer 104, and the upper shield layer 105 are sequentially formed on the trailing end surface 100b of the slider 100 to form the read part R. Next, the insulating layer 130 is formed on an exposed portion of the protective layer 101 and the upper shield layer 105. The heating element 131 is then formed on the insulating layer 130 in a predetermined pattern overlapping a region where the lower coil portions 107 are to be formed and a region where the read part R is formed. The pattern of the heating element 131 can be of any shape. The insulating layer 133 is formed on the insulating layer 130 and the heating element 131. After the layers from the protective layer 101 to the insulating layer 133 are formed, a hole is formed in the individual layers behind the read part R and the region where the lower coil portions 107 are to be formed in the height direction to partially expose the trailing end surface 100b of the slider 100. The conductive layer 136 is formed in the hole. The heat-dissipating layer 135 is formed on the insulating layer 133 and the conductive layer 136 such that the heat-dissipating layer 135 is positioned between the heating element 131 and the lower coil portions 107 to be formed later. In plan view, the heat-dissipating layer 135 is wider than the heating element 131 and the lower coil portions 107 to be formed later both in the track-width direction and in the height direction. The heat-dissipating layer 135 is in contact with the conductive layer 136 behind the read part R in the height direction and accordingly is connected to the slider 100 via the conductive layer 136. After the heat-dissipating layer 135 is formed, the write part W is formed by a known process. That is, the coil insulating layer 106, the lower coil portions 107, the organic insulating layer 108 for filling the gaps between the lower coil portions 107, and the lower coil insulating layer 109 are sequentially formed on the heat-dissipating layer 135. Subsequently, the main pole layer 110, the magnetic gap layer 111, the throat-height-defining layer 117, the coil insulating layer 112, the upper coil portions 113, the organic insulating layer 114, the upper coil insulating layer 115, and the return yoke layer 118 are sequentially formed on the lower coil insulating layer 109. The surface protective layer 120 is formed over the return yoke layer 118 and the lower coil insulating layer 109. Thus, the perpendicular magnetic recording head H1 is finished.

In this embodiment, the individual layers from the protective layer 101 to the insulating layer 133 are formed before the conductive layer 136 is formed. Alternatively, the conductive layer 136 can be formed by stacking sublayers one by one as the individual layers from the protective layer 101 to the insulating layer 133 are formed. If the conductive layer 136 is formed by stacking sublayers one by one, part of the conductive layer 136 (sublayers positioned at the same levels as the lower shield layer 102 and the upper shield layer 105) is preferably formed simultaneously in the same steps as the formation of the lower shield layer 102 and the upper shield layer 105 using the same materials.

While the perpendicular magnetic recording head including the solenoidal write coil has been described in the first embodiment, the present invention can also be applied to a perpendicular magnetic recording head including a spiral write coil.

Figure 3:
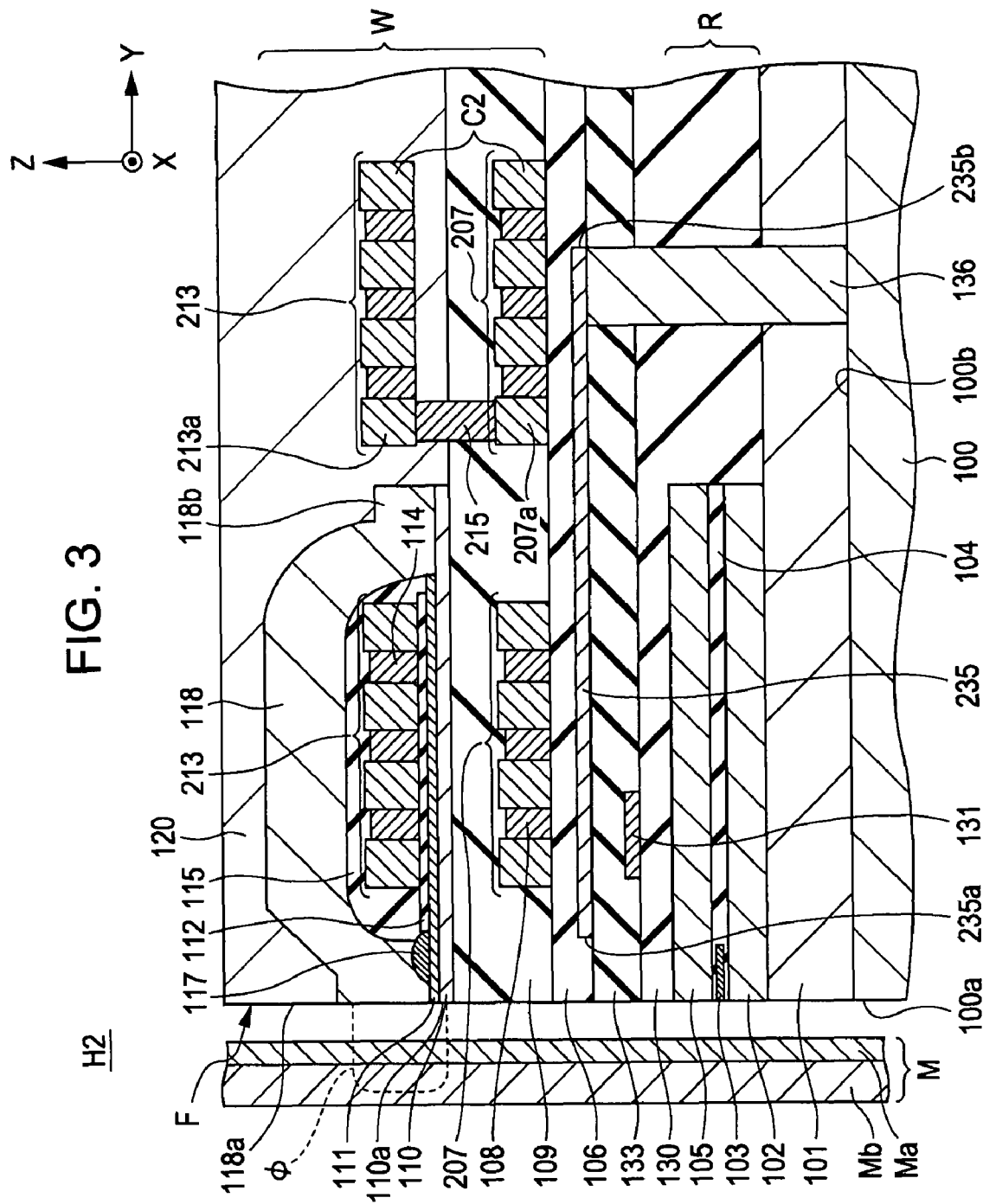
FIG. 3 is a longitudinal sectional view of a perpendicular magnetic recording head according to a second embodiment of the present invention.
Figure 4:
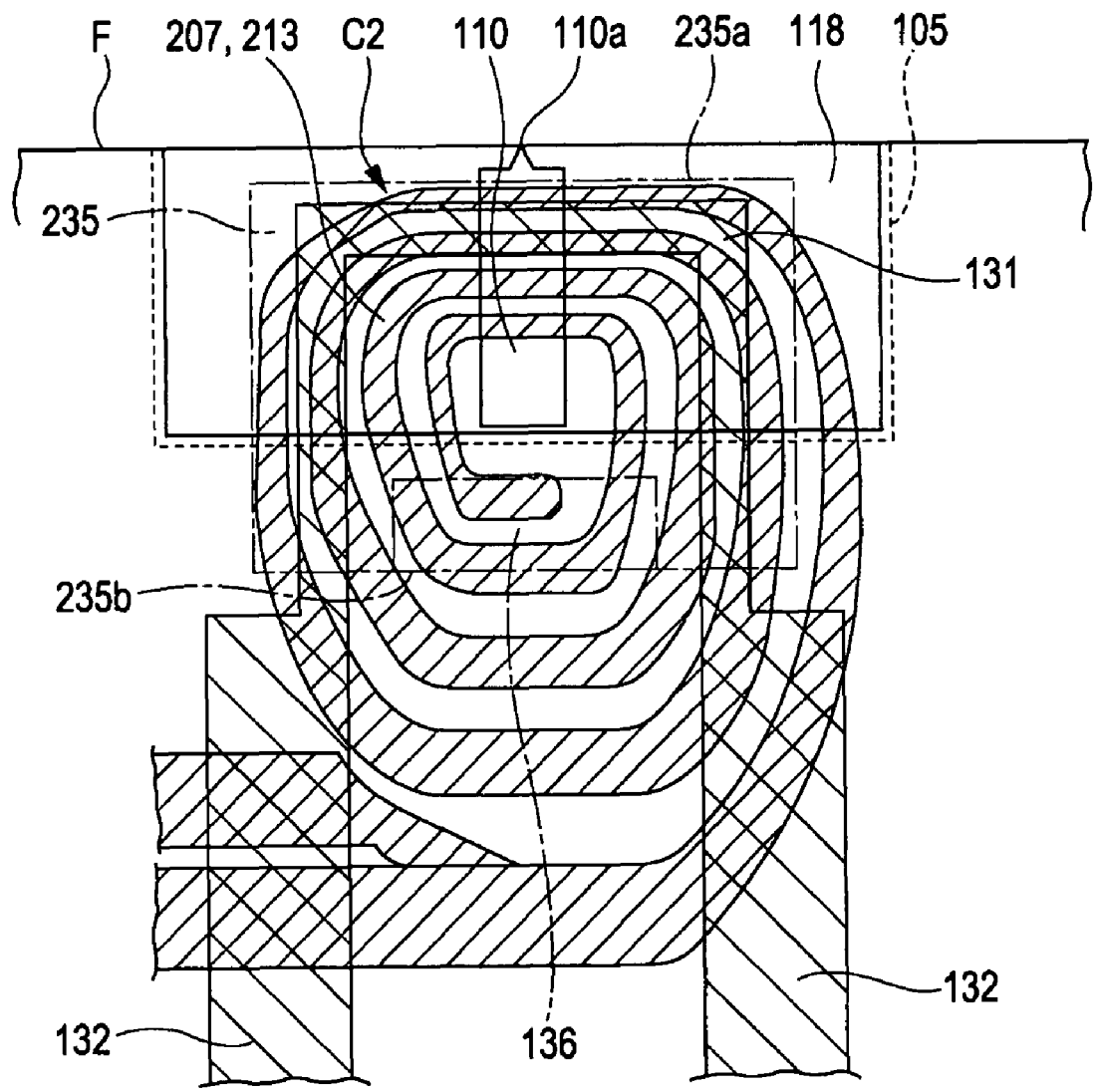
FIG. 4 is a plan view of the perpendicular magnetic recording head shown in FIG. 3, showing the positional relationship between a heating element, a heat-dissipating layer, a conductive layer, and a write coil (lower coil portion)
Figure 5:
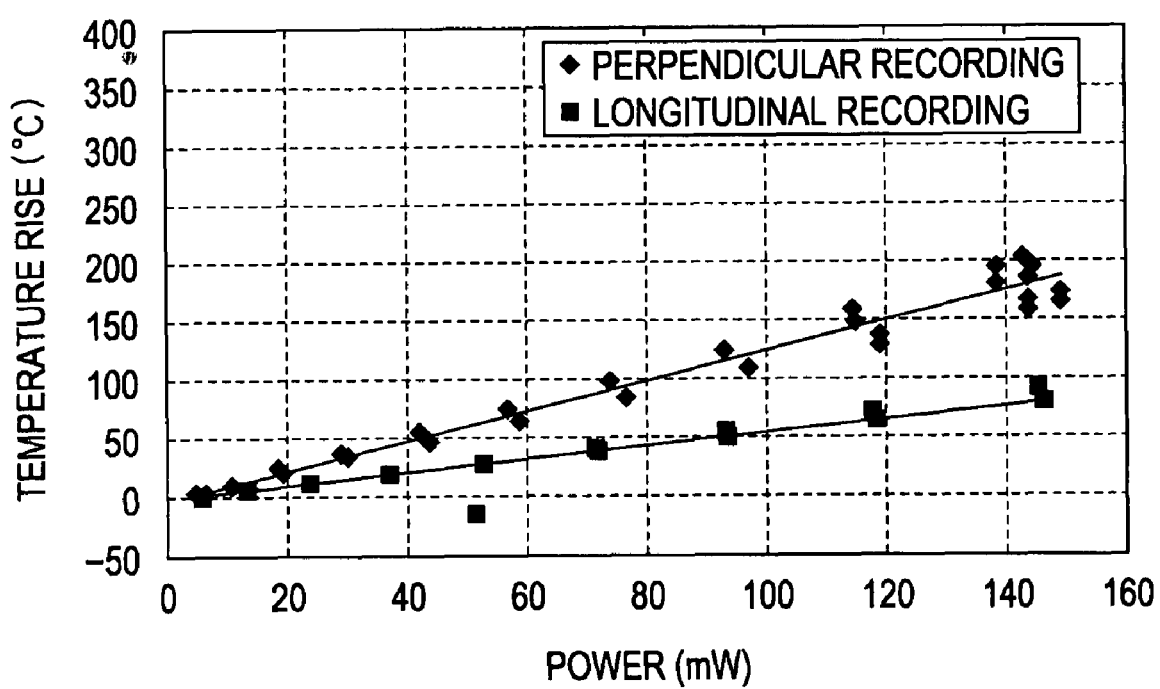
FIG. 5 is a graph showing measurements of the temperature rise of write coils of perpendicular and longitudinal thin-film magnetic recording heads with varying powers supplied to heating elements.

FIGS. 3 and 4 depict a perpendicular magnetic recording head including a spiral write coil according to a second embodiment of the present invention. FIG. 3 is a longitudinal sectional view of the perpendicular magnetic recording head which is taken along the center of a read part and a write part. FIG. 4 is a plan view of the perpendicular magnetic recording head as viewed from above the write coil. The second embodiment has the same structure as the first embodiment except for the types of write coil and heat-dissipating layer. In FIGS. 3 and 4, the same reference numerals as used in FIGS. 1 and 2 indicate the same components.

A perpendicular magnetic recording head H2 includes a spiral write coil C2. This write coil C2 is a flat spiral coil wound around the connection portion 118b of the return yoke layer 118. The write coil C2 has a double-layer structure including a lower coil portion 207 formed between the coil insulating layer 106 and the main pole layer 110 and an upper coil portion 213 formed between the main pole layer 110 and the return yoke layer 118. The lower coil portion 207 and the upper coil portion 213 are formed of, for example, at least one nonmagnetic metal material selected from gold, silver, platinum, copper, chromium, aluminum, titanium, NiP, molybdenum, palladium, rhodium, and nickel. The lower coil portion 207 and the upper coil portion 213 are connected to each other via a contact portion 215 disposed on winding center portions 207a and 213a behind the connection portion 118b of the return yoke layer 118 in the height direction. The contact portion 215 is formed of the same nonmagnetic metal material as the lower coil portion 207 and the upper coil portion 213. The gaps between the turns of the lower coil portion 207 are filled with the organic insulating layer 108, and the lower coil portion 207 is covered with the lower coil insulating layer 109. The gaps between the turns of the upper coil portion 213 are filled with the organic insulating layer 114, and the upper coil portion 213 is covered with the upper coil insulating layer 115.

A heat-dissipating layer 235 having a heat dissipation effect is disposed between the lower coil portion 207 and the heating element 131. In FIG. 4, the heat-dissipating layer 235 has a rectangular shape in plan view. The heat-dissipating layer 235 has a front end 235a positioned closer to the surface F than the heating element 131 without being exposed in the surface F and a rear end 235b positioned behind the upper shield layer 105 and the return yoke layer 118 in the height direction. The length of the heat-dissipating layer 235 in the height direction (the distance between the front end 235a and the rear end 235b) is larger than that of the heating element 131. The width of the heat-dissipating layer 235 in the track-width direction is larger than that of the heating element 131. In other words, the heat-dissipating layer 235 is wider than the heating element 131 both in the height direction and in the track-width direction. The heat-dissipating layer 235 diffuses (dissipates) heat from the heating element 131 over a wide area. The heat-dissipating layer 235 is formed by, for example, sputtering of a metal material with excellent thermal conductivity which contains at least one metal selected from copper, gold, aluminum, platinum, silver, tungsten, nickel, rhodium, iron, cobalt, chromium, tantalum, and titanium. The heat-dissipating layer 235 has a thickness on the order of hundreds of nanometers.

The rear end 235b of the heat-dissipating layer 235 is connected to the conductive layer 136, which is formed of a material with high thermal conductivity, such as copper, gold, aluminum, platinum, or permalloy. The heat-dissipating layer 235 is connected to the slider 100 via the conductive layer 136. The conductive layer 136 can enhance the heat dissipation effect of the heat-dissipating layer 235 by transferring heat absorbed by the heat-dissipating layer 235 to the slider 100. The slider 100 has a much larger surface area than the heat-dissipating layer 235 and can release the heat to the outside.

In read operation of the perpendicular magnetic recording head H2, most of heat radiated upward from the heating element 131 does not reach the lower coil portions 107 or the main pole layer 110 because the heat is absorbed by the heat-dissipating layer 135 and is released to the outside via the conductive layer 136 and the slider 100. The heat-dissipating layer 235 can therefore reduce a rise in coil temperature due to the heat from the heating element 131 to suppress thermal expansion of the main pole layer 110. This prevents the main pole layer 110 from excessively protruding toward the recording medium M and thus prevents the write part W, including the main pole layer 110, from damaging the recording medium M by butting thereagainst. On the other hand, heat radiated from the heating element 131 downward and toward the surface F causes the read element 103 to protrude locally toward the recording medium M as a result of thermal expansion. The local protrusion thus reduces the distance between the read element 103 and the recording medium M to increase read output. In write operation of the perpendicular magnetic recording head H2, heat is transferred from the lower coil portion 207 and the upper coil portion 213 to the heat-dissipating layer 235, which is positioned under the lower coil portion 207. The heat-dissipating layer 235 releases the heat to the outside via the conductive layer 136 and the slider 100, thus preventing the write part W from protruding toward the recording medium M as a result of thermal expansion. The second embodiment has the same advantages as the first embodiment.

In the above embodiments, the heat-dissipating layers 135 and 235 release heat from the heating element 131 to the outside to reduce a rise in coil temperature due to the heat from the heating element 131. The heat-dissipating layers 135 and 235 can therefore suppress the amount of protrusion of the main pole layer 110 toward the recording medium M due to thermal expansion. Accordingly, only the read part R (read element 103) is thermally expanded to protrude toward the recording medium M, thus increasing read output. The write part W, including the main pole layer 110, does not damage the recording medium M.

Although the present invention is applied to a perpendicular magnetic recording head including a solenoidal or spiral write coil in the above embodiments, the invention can be applied to any perpendicular magnetic recording head having a heating element between a read element and a write coil irrespective of the shape of write coil. In addition, although write coils having a double-layer structure including lower and upper layers are used in the above embodiments, a write coil having a single-layer structure or a multilayer structure including three or more layers can also be used.

What is claimed is:

1. A perpendicular magnetic recording head comprising:
   a read part disposed on a substrate to read magnetic recording information from a recording medium by a magnetoresistance effect;
   a write part disposed above the read part to record magnetic information on the recording medium by applying a perpendicular magnetic field, the write part including a write coil;
   a heating element disposed between the write coil and the read part, the heating element generating heat when supplied with current so that the read part is thermally expanded to protrude toward the recording medium;
   a heat-dissipating layer disposed between the write coil and the heating element, the heat-dissipating layer having a heat dissipation effect; and
   a conductive layer behind the read part and the write part in a height direction, the heat-dissipating layer being connected to the substrate via the conductive layer to transfer heat from the write coil to the substrate,
   wherein the heat-dissipating layer overlaps with the heating element as seen from a stacking direction of layers constituting the perpendicular magnetic recording head.

2. The perpendicular magnetic recording head according to claim 1, wherein the heat-dissipating layer is wider than the heating element both in a track-width direction and in a height direction.

3. The perpendicular magnetic recording head according to claim 1, wherein the heat-dissipating layer has a front end positioned closer to a surface of the head facing the recording medium than the heating element without being exposed in the surface facing the recording medium and a rear end positioned behind an upper shield layer of the read part and a return yoke layer of the write part in a height direction.

4. The perpendicular magnetic recording head according to claim 1, wherein the heat-dissipating layer comprises a metal material containing at least one metal selected from gold, copper, aluminum, platinum, silver, tungsten, nickel, rhodium, iron, cobalt, chromium, tantalum, and titanium.

* * * * *